(12) United States Patent
Shi et al.

(10) Patent No.: US 8,248,919 B2
(45) Date of Patent: Aug. 21, 2012

(54) METHOD, DEVICE AND SYSTEM FOR UPDATING ROUTES AFTER NODE FAILS IN P2P NETWORK

(75) Inventors: Guangyu Shi, Shenzhen (CN); Jian Chen, Shenzen (CN); Hao Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 12/605,931

(22) Filed: Oct. 26, 2009

(65) Prior Publication Data

US 2010/0039931 A1 Feb. 18, 2010

Related U.S. Application Data

(63) Continuation of application No. PCT/CN2008/072836, filed on Oct. 27, 2008.

(30) Foreign Application Priority Data

Nov. 22, 2007 (CN) .......................... 2007 1 0188100

(51) Int. Cl.
*H04J 1/16* (2006.01)
(52) U.S. Cl. .......................... 370/218; 370/221; 370/238
(58) Field of Classification Search .................. 370/218, 370/221, 238
See application file for complete search history.

(56) References Cited

U.S. PATENT DOCUMENTS

| | | | | |
|---|---|---|---|---|
| 7,987,506 B1* | 7/2011 | Khalid et al. | ................... | 726/15 |
| 2002/0067693 A1* | 6/2002 | Kodialam et al. | ............. | 370/216 |
| 2003/0212793 A1* | 11/2003 | Kumar | .......................... | 709/226 |
| 2005/0063318 A1 | 3/2005 | Xu et al. | | |
| 2005/0226216 A1* | 10/2005 | Oyama et al. | ................. | 370/351 |
| 2006/0187819 A1* | 8/2006 | Bryant et al. | ................. | 370/216 |
| 2007/0038767 A1* | 2/2007 | Miles et al. | ................... | 709/230 |

(Continued)

FOREIGN PATENT DOCUMENTS

CN 1283076C A 1/2005

(Continued)

OTHER PUBLICATIONS

PCT Office Written Opinion in PCT Application No. PCT/CN2008/072836 mailed Feb. 5, 2009.

(Continued)

*Primary Examiner* — Andrew Lee

(57) ABSTRACT

A method for updating routing table information after a node fails in a P2P network is disclosed herein. The method includes: the range of the nodes whose route is directed to the failed node is determined according to the distance between the failed node and the neighboring node of the failed node; the failure information of the failed node is sent to the LDN of the failed node within the node range; and the LDN updates the routing table according to the failure information. A network device and a P2P communication network are also disclosed herein. The embodiments of the present invention enhance the capability of the whole P2P network in perceiving node churn and improve the route search efficiency and system stability of the whole P2P network.

18 Claims, 9 Drawing Sheets

U.S. PATENT DOCUMENTS

| | | | |
|---|---|---|---|
| 2007/0201355 A1* | 8/2007 | Vasseur et al. | 370/217 |
| 2008/0019363 A1* | 1/2008 | Kitajima | 370/391 |
| 2008/0101259 A1* | 5/2008 | Bryant et al. | 370/254 |
| 2008/0270421 A1* | 10/2008 | Ushiyama | 707/10 |
| 2008/0279103 A1* | 11/2008 | Yong et al. | 370/235 |
| 2009/0310488 A1* | 12/2009 | Mighani et al. | 370/235 |
| 2010/0131564 A1* | 5/2010 | Pettovello | 707/794 |

FOREIGN PATENT DOCUMENTS

| | | |
|---|---|---|
| CN | 1564543 A | 1/2005 |
| CN | 1681257 A | 10/2005 |
| CN | 101442479 B | 3/2011 |
| EP | 1802070 A1 | 6/2007 |

OTHER PUBLICATIONS

European Patent Office Communication in European Application No. 08856338.2-2416 mailed Feb. 17, 2010.

Hsiao, Hung-Chang, et al., "Mobility Churn in DHTs," *Proceedings of the 25th IEEE International Conference on Distributed Computing Systems Workshops (ICDCSW'05)*, 2005.

Zhuang, Shelly Q., et al., "On Failure Detection Algorithms in Overlay Networks," *IEEE*, 2005.

Wepiwé, Giscard, et al., *HiPeer: An Evolutionary Approach to P2P Systems*, Jun. 19, 2006.

\* cited by examiner

METHOD, DEVICE AND SYSTEM FOR UPDATING ROUTES AFTER NODE FAILS IN P2P NETWORK

CROSS-REFERENCE TO RELATED APPLICATIONS

This application is a continuation of PCT/CN2008/072836, filed on Oct. 27, 2008, which claims priority to Chinese Patent Application No. 200710188100.1, filed on Nov. 22, 2007, both of which are hereby incorporated by reference in their entireties.

FIELD OF THE INVENTION

The present invention relates to communication technologies, and in particular, to a method, a device, and a system for updating routes after a node fails in a Peer-to-Peer (P2P) network.

BACKGROUND

Unlike the traditional client/server system, a P2P system is characterized by operations between peers. Each peer in the P2P system can serve other peers and be served by other peers. Depending on the topology, P2P systems are sorted into these types: centralized topology, decentralized unstructured topology, decentralized structured topology (also known as DHT network), and hybrid topology.

The current prevalent topology of P2P systems is a Distributed Hash Table (DHT) network. A majority of applications in the P2P system are based on the DHT network. In such systems, a unique identifier (node ID) of a node is obtained through Hash operation according to unique attributes such as an IP address of the node. The data item corresponding to the node ID is expressed by a key pair <key, value>, where a key is an index to a data item, and a value may a locating address (for example, IP or URL) of the data item. Through Hash operation, a unique identifier is assigned to a data index key, and the key value pair corresponding to this key is stored into the node nearest to this key identifier. The unique identifier may be obtained through Hash operation after the key value pair is found. Through the unique identifier, the nearest node is found (the nearest node stores the address of the data item).

Meanwhile, the P2P system is a self-organized network. In this network, a node can join or quit the network randomly. The randomness leads to inaccuracy of locating the resources and churning of the network. The extent of network churn directly affects the efficiency of the route discovery method. Network churn is caused by joining, quitting, failure, or migration of a node; or by a concurrent joining process or network splitting. The way of handling different network churns in the DHT route searching method of the P2P network directly affects the route efficiency and the load overhead of the whole P2P network.

Two solutions to P2P network churn are provided in the prior art.

Prior Art 1

In the process of handling network churn in the DHT network, three major elements are considered: fast replacement of the node, timeout detection, and the nearest neighboring node. This technology resists network churn directly in this way: K sequential nodes in the P2P node ID space ping each other to keep connection between nodes.

In the operation process of the P2P network, each node sends a Ping maintenance message to K sequential nodes around at intervals. The K sequential nodes receive the Ping message from the source node, and then feed back a message to the source node, indicating that the node is still alive and the routing table of the source node needs no change. When a node in the network fails, the neighboring nodes around can discover the node churn through proactive ping, find the failed node, and broadcast the failure information to the K sequential nodes, which therefore update their routing table links.

In the process of developing the present invention, the inventor finds at least the following defects in the prior art 1.

In the prior art 1, the K sequential nodes in the P2P node ID space ping each other to keep connection between the nodes, namely, the maintenance information is transferred only between K neighboring nodes. When a node fails in a network, the routing table information keeps continuity of only K nodes. In the attempt to search for a node in the network, "crawling" may occur. That is, the routing table information of the node which is originally directed to the failed node has failed, and the remote node finds the substitute node of the failed node only through a second recursive search. If the two nodes are farther away from each other, the problem is more serious, and the recursive search occurs more frequently between the nodes. When the network churns drastically, if multiple key routing nodes fail in the P2P path, the routing table information crawls more slowly in the network, and node has to search for the next step of the route at an interval of K hops.

In the P2P network, the churn and the crawl accrue. With increase of the failed nodes in the network, the failure information is not broadcast effectively, and most nodes keep the original failure routing table. Consequently, the crawl occurs more frequently and lasts for longer periods. At worst, the time complexity of searching for a node reaches O(N) times (N is the number of nodes in the P2P Overlay), which affects the efficiency of route searching in the P2P network seriously.

Prior Art 2

The current survival probability of a node is predicted according to the history lifecycle information of the nodes throughout the network. Specifically, the history lifecycle distribution probability of nodes throughout the P2P network is collected, the survival probability of a node in the next period is deduced, and prediction information about the actions of the nodes throughout the network is generated for deciding the next-step action of the network. When a node is predicted to be stable in the next period, its neighboring node reduces the Ping maintenance operation for this node, thus reducing the overhead of the maintenance bandwidth.

In the process of developing the present invention, the inventor finds at least the following defects in the prior art 2.

The more sophisticated the P2P network is, the less accurate the prediction of the node lifecycle will be. In the prediction process, many system parameters need to be set, and the selection of the parameter values is specific to each situation. Different parameter settings may lead to drastic inaccuracy of the prediction.

Besides, the prior art 2 reduces the system maintenance overhead, but makes no improvement for the efficiency of the route searching method of the P2P network. When the network churns seriously, the complexity of searching for a node is still up to O(N) times, and the crawl still exists in the process of searching for the route, thus leading to low efficiency of searching for the route.

SUMMARY

According to some embodiments of the present invention, a method, a device, and a system for updating routing table information after a node fails in a P2P network are provided to enhance the capability of the whole network in perceiving the node churn and improve the route search efficiency and system stability of the whole network.

Some embodiments of the present invention are implemented through the following technical solution.

A method for updating routing table information after a node fails in a P2P network is disclosed herein. The method includes:

determining the range of the nodes whose route is directed to the failed node according to the distance between the failed node and the neighboring node of the failed node;

sending the failure information of the failed node to a Long Distance Neighbor (LDN) of the failed node within the node range; and updating, by the LDN, the routing table information according to the failure information.

A network device is provided in an embodiment of the present invention. The network device includes:

a first determining module, adapted to determine the range of the nodes whose route is directed to the failed node according to the distance between the failed node and the neighboring node of the failed node; and a first sending module, adapted to send the failure information of the failed node to the LDN of the failed node within the node range.

A network device is provided in an embodiment of the present invention. The network device is the LDN of the failed node, and includes:

a receiving module, adapted to receive failure information of the failed node; and a processing module, adapted to update the routing table according to the failure information.

A communication network is disclosed herein includes a failed node, a neighboring node of the failed node, and a LDN.

The neighboring node of the failed node is adapted to determine the range of the nodes whose route is directed to the failed node according to the distance between the failed node and the neighboring node of the failed node, and send the failure information of the failed node to the LDN of the failed node within the node range.

The LDN is adapted to: receive the failure information, and update the routing table according to the failure information.

In some embodiments of the present invention, the range of the nodes whose route is directed to the failed node is determined according to the distance between the failed node and the neighboring node of the failed node; the failure information of the failed node is sent to the LDN of the failed node within the node range; the LDN updates the routing table according to the failure information. Compared with the prior art which notifies the failure information to only K neighboring nodes in the case of node failure, the embodiments of the present invention enhance the capability of the whole P2P network in perceiving the node churn and improve the route search efficiency and system stability of the whole P2P network.

DETAILED DESCRIPTION

The embodiments of the present invention are detailed below by reference to accompanying drawings.

Figure 1:
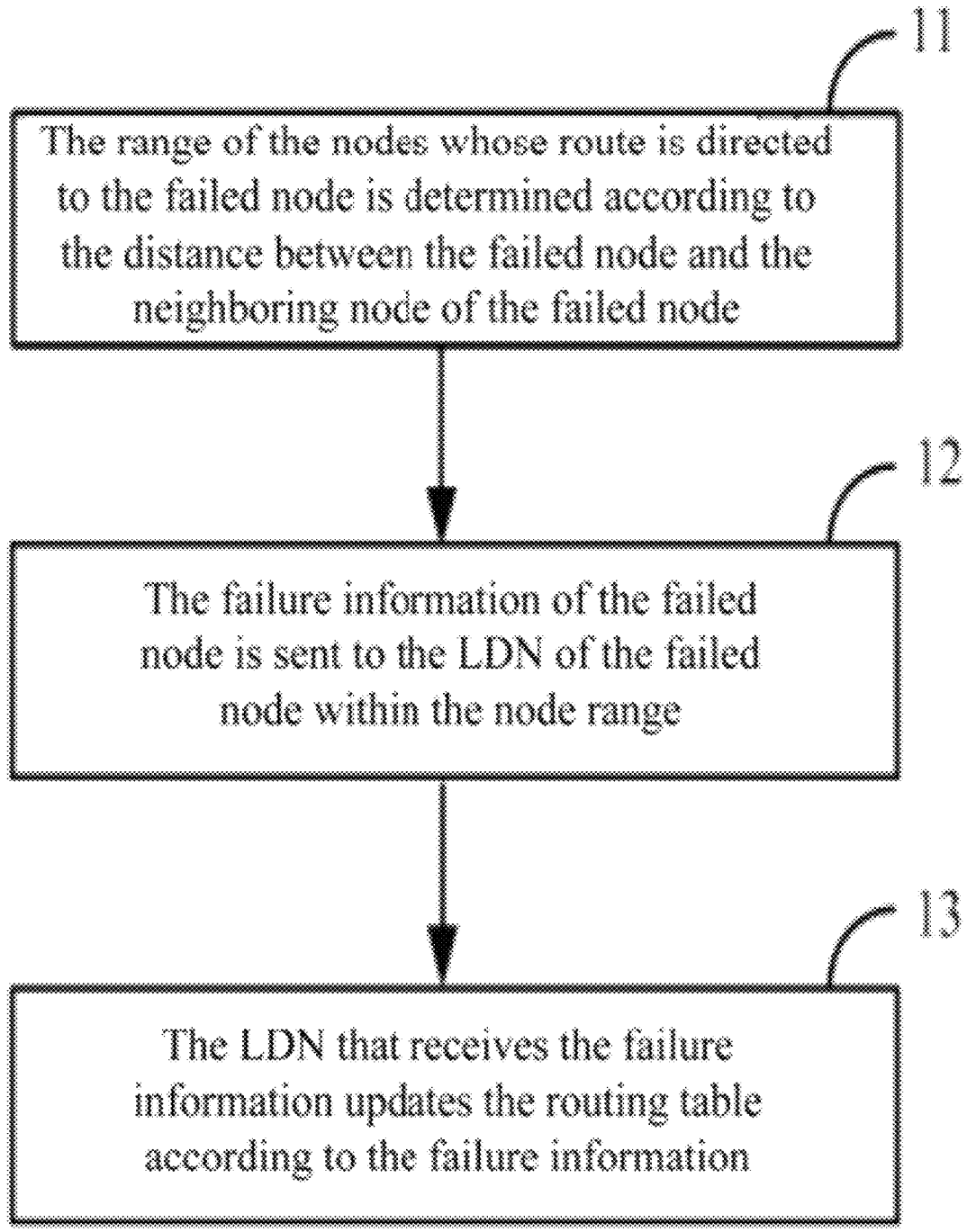
FIG. 1 is a flowchart of updating routing table information after a node fails in a P2P network according to an embodiment of the present invention.

As shown in FIG. 1, the process of updating routing table information after a node fails in a P2P network is as follows:

Step 11: The range of the nodes whose route is directed to the failed node is determined according to the distance between the failed node and the neighboring node of the failed node.

Step 12: The failure information of the failed node is sent to the LDN of the failed node within the node range. There are i LDNs (i is a natural number greater than 0). If the node ID of node B differs from the node ID of node A only in the i bit (i is an ordinal number) and all other bits are the same or nearest to each other, then node B is LDN[i] of node A.

Step 13: The LDN that receives the failure information updates the routing table according to the failure information, and directs the routing table information, which is originally directed to the failed node, to the substitute node of the failed node.

In the flow shown in FIG. 1, before the range of the nodes whose route is directed to the failed node is determined, the state of the neighboring node in the network may be probed periodically to determine the failed node. Depending on the set period of probing, the failed node may be a node that fails abruptly in the current network, or a node that fails in the network a period ago. In different networks, the range of the nodes whose route is directed to the failed node (which is determined according to the distance between the failed node and the neighboring node of the failed node) differs. In an embodiment, the range of the nodes whose route is directed to the failed node may be determined according to the distance between the failed node and the neighboring node of the failed node and the route features of the network.

In step 12, according to the key value feature stored in the network, the substitute node is selected among the neighboring nodes of the failed node to send failure information. The substitute node sends the failure information of the failed node to the LDN of the failed node within the range of the nodes whose route is directed to the failed node. The failure information includes the address of the substitute node, and optionally, may further include a least one of an identifier of the failed node, an address of the failed node, and a key value of the failed node. In an embodiment, the failure information further includes the impact range within which the LDN is impacted by the failed node. After receiving the failure information, the LDN may forward the failure information to the nodes within the impact range.

When the LDN determines that the impact range does not exceed the maintenance range of the neighboring nodes of the local node, the LDN may forward the failure information to the nodes within the impact range directly. Alternatively, when the LDN determines that the impact range exceeds the maintenance range of the neighboring nodes of the local node, preferably, the LDN forwards the failure information to the neighboring node nearest to the impact range, and the neighboring node further forwards the failure information to other nodes in the impact range. Nevertheless, in the case, the LDN may forward the failure information to other nodes, and the node which receives the failure information further forwards the failure information to other nodes in the impact range. After receiving the failure information, the node in the impact range updates the routing table, namely, directs the routing table information, which is originally directed to the failed node, to the substitute node of the failed node.

Figure 2:
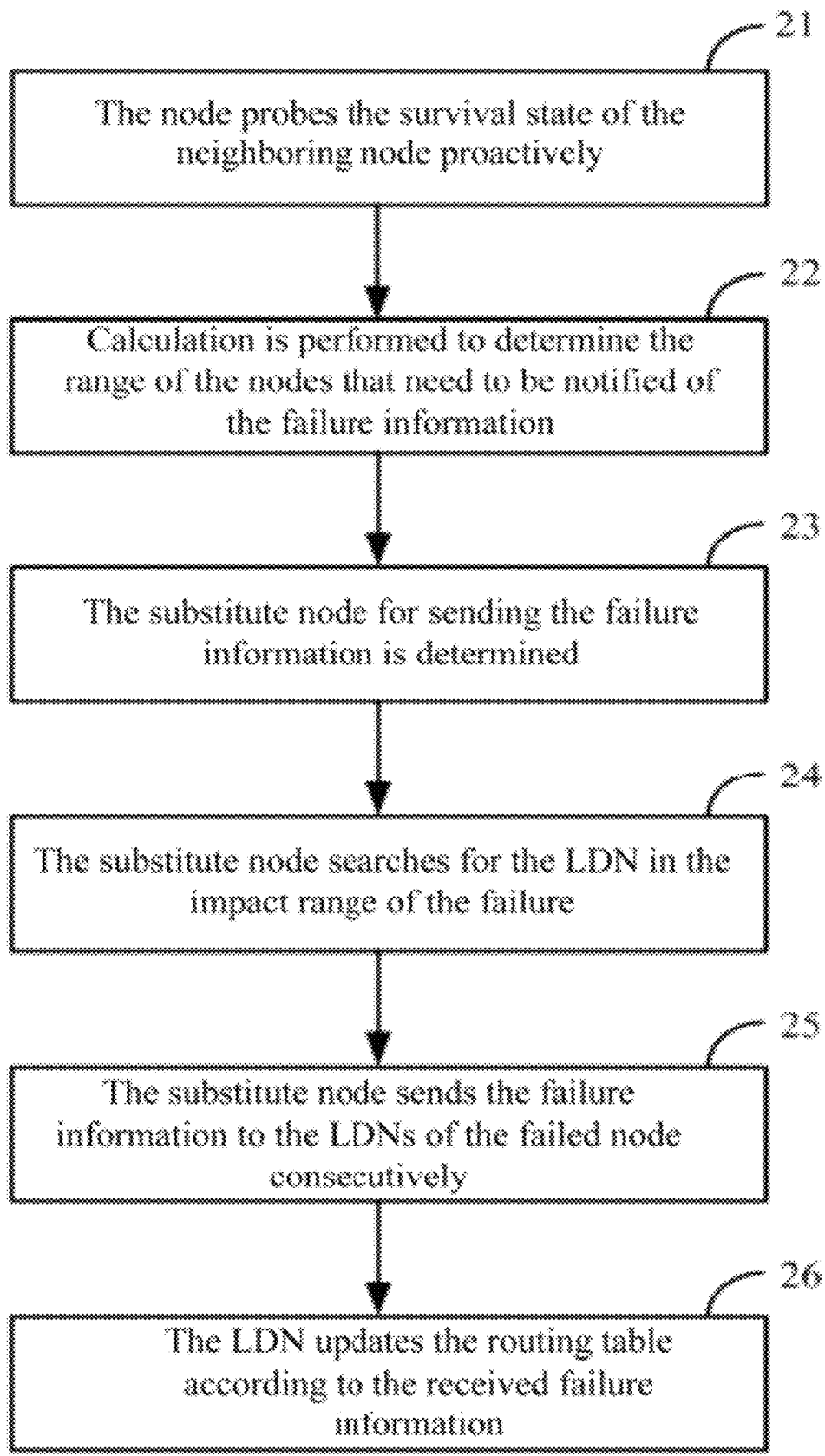
FIG. 2 shows an instance of updating routing table information after a node fails in a P2P network according to an embodiment of the present invention.
Figure 3:
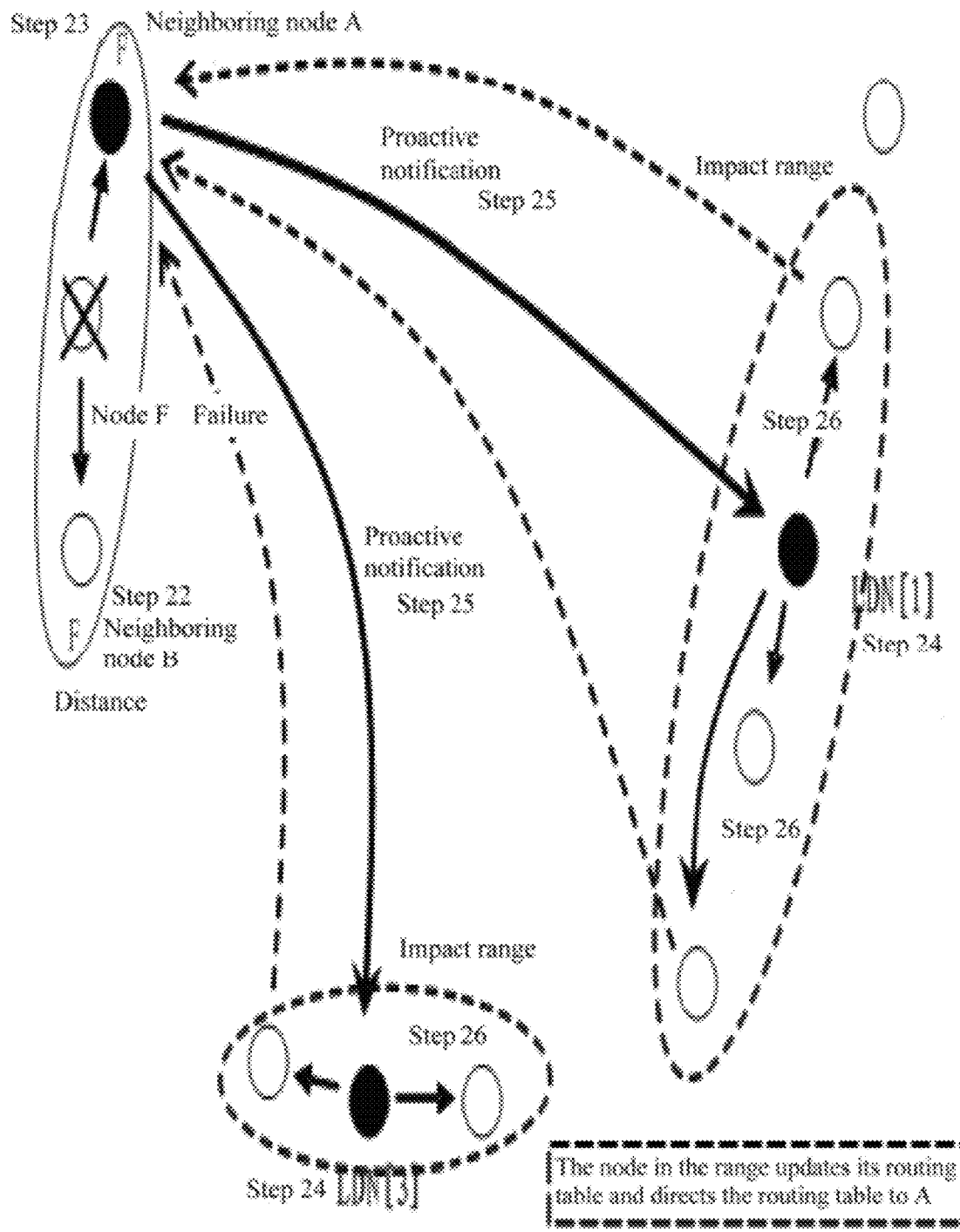
FIG. 3 shows an instance of updating routing table information after a node fails in P2P network architecture according to an embodiment of the present invention.

FIG. 2 is a flowchart of updating routing table information after a node fails in a P2P network in an embodiment of the present invention. As regards the implementation of this flow in the P2P network, the process of updating routing table information shown in FIG. 3 serves as a reference. The updating process is as follows:

Step 21: A node probes the survival state of the neighboring node proactively. For example, node B probes the neighboring node at intervals, and obtains the survival state of the neighboring node F.

Step 22: When a node (node F) fails, the neighboring node (node B) discovers failure of node F through step 21, and calculates the range of notifying failure information. The neighboring node (node B) calculates the range of the nodes whose route is directed to the failed node throughout the network based on different DHT network routing method features according to the distance between the node ID of the neighboring node (node B) and the node ID of the failed node (node F).

Step 23: The neighboring node (node B) determines a substitute node (node A) for sending the failure information. Step 23 may occur before, during, or after step 22.

After calculating the impact range of the failed node, the neighboring node may select a neighboring node as the substitute node for sending the node failure information according to the key value features stored in different DHT networks. In the Kademlia network or Pastry network, the stored key value is selected based on the distance of the node ID of the node, the substitute node is the neighboring node at the minimum XOR distance away from the failed node. In the Chord network or Koorde network, the stored key value is selected based on the nearest successor node, the substitute node is the node subsequent to the failed node.

Step 24: The substitute node (node A) searches for the LDN in the impact range of the failure. The neighboring node that serves as a substitute node finds the LDN[i] node corresponding to the failed node in each range through the route search method. The LDN[i] node may be the node nearest to the failed node in each range.

Step 25: The substitute node (node A) sends the failure information to the LDNs of the failed node consecutively. After the LDN(i) of each impact range of the failed node is found, the substitute node sends the node failure information to the LDNs consecutively. Failure information includes the address of the substitute node, and optionally, may further include at least one of the identifier of the failed node, the address of the failed node and the key value of the failed node.

The neighboring node can also notify the impact range of the failed node to each LDN. For example, the failure information includes the range of impact caused by the failed node onto the LDNs, and notifies the LDNs to update the corresponding routing table information and forward the failure information among the neighbors of the LDNs according to the impact range of the failure information.

Step 26: After receiving the failure information, the LDN updates the routing table, and directs the routing table information, which is originally directed to the failed node, to the substitute node (node A). Further, the LDN node forwards the failure information to its neighboring node according to the received impact range of the failed node.

Each LDN node calculates how many neighboring nodes around need to know the node failure information according to the received impact range of the failed node, and forwards the information to such nodes. If the range of nodes which need to receive the information exceeds the range of neighboring nodes, the LDN notifies the neighbor nearest to the range to further notify (for example, multicast) the information to other nodes within the range. Through multiple hops, all the nodes in the range are notified. Nevertheless, in the case, the LDN may also forward the failure information to other nodes, and the node that receives the failure information further forwards the failure information to other nodes in the impact range.

The nodes in the impact range update their routing tables. After receiving the failure information, the node in the impact range directs the pointer, which is originally directed to the failed node, in the routing table to the substitute node of the failed node, thus updating the routing table.

The embodiments of the present invention are detailed below, taking different P2P networks as examples.

I. Taking a Kademlia DHT Network as an Example

Figure 4:
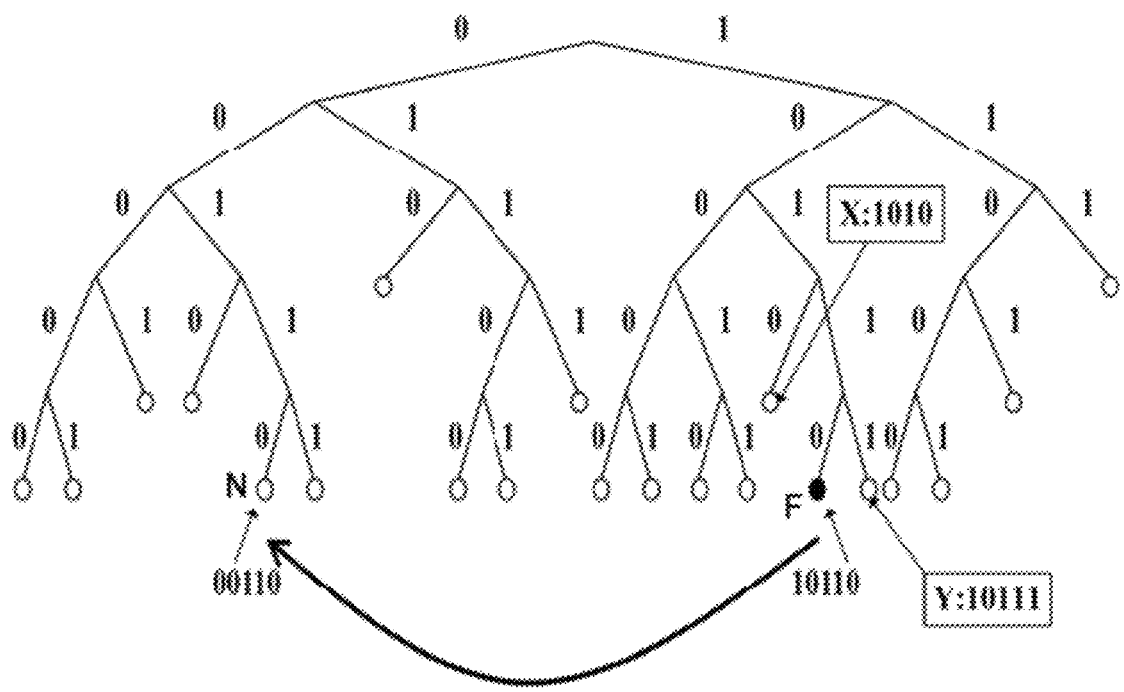
FIG. 4 shows a schematic view of node failure in a Kademlia DHT network according to an embodiment of the present invention.

Supposing that node 10110 in the Kademlia network shown in FIG. 4 fails, according to the method under the present invention, its neighboring nodes 1010 and 10111 discovers failure of the node 10110 through proactive probe, and can calculate the range of impact of the failure information according to the distance between the node ID of the neighboring node and the node ID of the failed node, when the node 10110 in the network fails. According to the features of the Kademlia network, when node F fails, all the nodes whose routing table pointer has been directed to node F are covered in the following range:

$$\begin{cases} 2^{m-i} < XOR(N, F) \leq 2^{m-i+1} & (1) \\ XOR(N, F) < XOR(N, X) & (2) \\ XOR(N, F) < XOR(N, Y) & (3) \end{cases}$$

where:

node F fails and churns, node X is the predecessor node of node F, node Y is the successor node of node F, and node N needs to be notified of the failure information; and m is the number of bits of the node ID, the m in the Kademlia network is 160, and i ranges from 1 to m.

By reference to the foregoing formula, the range of impacting node N needs to fulfill the following:

The XOR distance between node N and the failed node F is greater than $2^{m-i}$ and less than or equal to $2^{m-i+1}$;

the XOR distance between node N and node F is less than the XOR distance between node N and node X; and the XOR distance between node N and node F is less than the XOR distance between node N and node Y. If node N fulfills the three expressions, N is the node that needs to be notified of the failure information.

Figure 5:
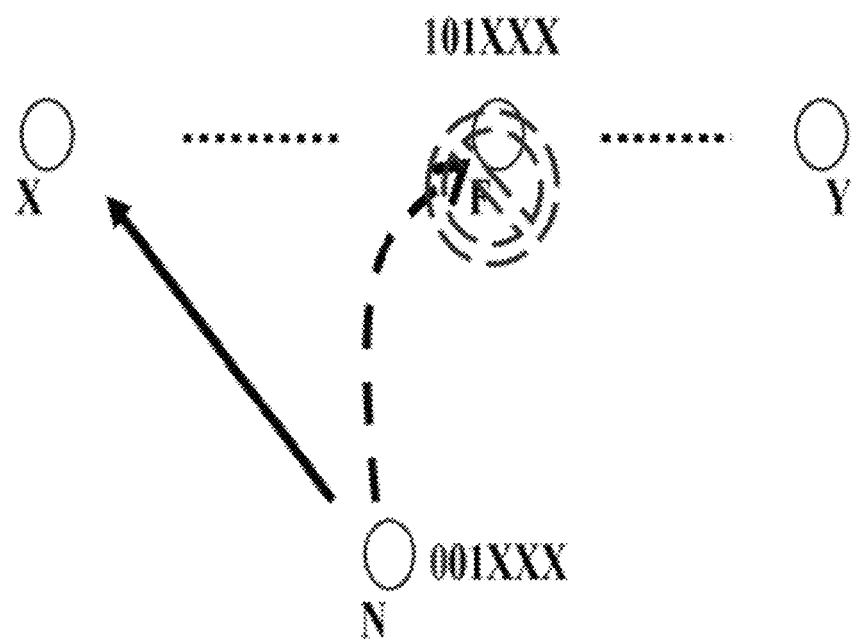
FIG. 5 shows a schematic flow of node failure in a Kademlia DHT network according to an embodiment of the present invention.

According to the difference between their own node ID and the node ID of the failed node 10110, node 1010 and node 10111 determines the substitute node of the failed node. Because the node ID difference between node 10111 and the failed node 10110 is less than that between node 1010 and the failed node 10110, the neighboring node 10111 is determined as the substitute node. The neighboring node 10111 finds a LDN node in each impact range determined through the foregoing formula, and notifies the failure information to all the LDN nodes. As shown in FIG. 5, in one embodiment, according to the symmetry or the Kademlia routing table, the LDN [1] of the node 10110 is 00110 because all the bits of the node 00110 are the same as those of the node 10110 except the initial bit. According to the composition of the Kademlia K bucket routing table, the node 00110 is in the K bucket routing table of the node 10110, and vice versa. Besides, according to the foregoing formula, the LDNs of the node 10110 further include: LDN[1]=00110, LDN[2]=111, LDN[3]=10010, LDN[4]=1010, and LDN[5]=10111.

After the range of the nodes to be notified is worked out and the LDN nodes in the range are found, the LDN node searches for the node N in the respective range and transmits the churn information to such node Ns, and the node Ns update their routing tables.

Through proactive notification, when the remote node needs to search for the failed node, the remote node can know the information state of the node and the neighboring substitute node directly, thus avoiding the trouble of crawling slowly to search for the failed node like the practice in a traditional P2P network.

II. Taking a Pastry DHT Network as an Example

The routing table structure of a Pastry network is similar to that in the Kademlia method, but differs in: The Pastry network changes the binary node ID to a Multi-ary node ID on the basis of the Kademlia network. In the implementation, the node ID may be changed from multi-ary to binary first, and then apply the Kademlia method on the Pastry network. The detailed process is as follows:

When node F churns, its nearest neighboring node X detects the churn. Afterward, the node X may work together with another neighbor of the failed node to find the node LDN[1] according to the range determined by the following formula, where the initial bit of LDN[1] is different from that of node F and the XOR difference between the remaining bits of LDN[1] and those of node F is the minimum, and notifies the churn information to the LDN[1]. The notification indicates that node F has failed, and all the routes subsequently directed to node F are directed to node X instead, and indicates that the churn information is forwarded among the nodes within the range. By analogy, the neighboring node X notifies other LDN[i] determined in this way: The i bit of LDN[i] is different from that of node F and the XOR difference between the remaining bits of LDN[i] and those of node F is the minimum. The neighboring node X tells the LDN[i] that node F has failed, and instructs the LDN[i] to notify other nodes in their respective ranges to update the routing table.

$$\begin{cases} 2^{m-i} < XOR(N, F) \le 2^{m-i+1} & (1) \\ XOR(N, F) < XOR(N, X) & (2) \\ XOR(N, F) < XOR(N, Y) & (3) \end{cases}$$

where:

k is a k-ary radix, and i ranges from 1 to m; and

X is the predecessor neighbor of the failed node F, Y is the successor neighbor of F, and N is the node that needs to be notified.

By reference to the foregoing formula, the range of impacting node N needs to fulfill the following:

The XOR distance between node N and the failed node F is greater than $2^{m-i}$ and less than or equal to $2^{m-i-1}$;

the XOR distance between node N and node F is less than the XOR distance between node N and node X; and the XOR distance between node N and node F is less than the XOR distance between node N and node Y. If node N fulfills the three expressions, N is the node that needs to be notified of the failure information.

In the implementation, Pastry differs from Kademlia in the following:

The Kademlia employs the binary node ID, and therefore, the Kademlia uses XOR operation to calculate the difference between two nodes; and the Pastry employs the multi-ary node ID, and needs to convert the multi-ary node ID in the Pastry network to the binary node ID first.

III. Taking a Chord DHT Example as an Example

Figure 6:
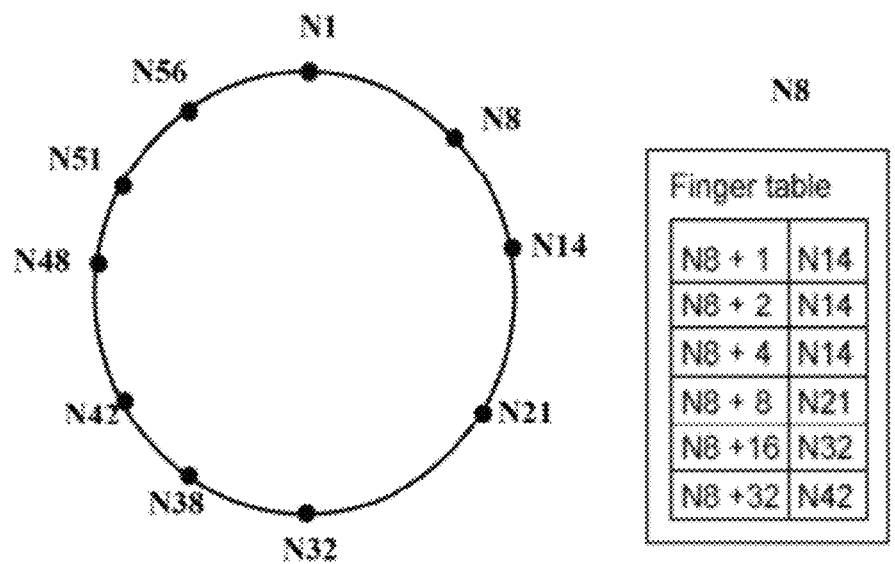
FIG. 6 shows a schematic structural view of a Chord network according to an embodiment of the present invention.

As shown in FIG. 6, in a Chord network, n nodes is Hashed to the token ring with the "log n" bits. Each node x is directed to its next successor node (the nearest node in the clockwise direction of the ring). It maintains a pointer table composed of m=log n entries. The i entry (i is an ordinal number) stores the subsequent ID of the $x+2^{i-1}$.

As shown in FIG. 5 and FIG. 6, when node F churns, according to the method of one embodiment, the neighboring node of F discovers the churn of F through proactive probe, and calculates the range of all the nodes (node N) whose routing table pointer has been directed to node F in the whole Chord ring according to the difference between the node ID of the neighboring node and the node ID of the failed node F.

predecessor(F)<(N+2$^i$)mod 2$^m$≦F 0≦i<m where predecessor(F) is the predecessor node of node F. According to the foregoing formula, the node ID of node N is added to $2^i$ to obtain a sum, and the sum modulo $2^m$ is greater than the node ID of the predecessor node of the failed node F and is less than or equal to the node ID of F. The node Ns in the range defined by the foregoing inequality are the nodes that need to be notified.

After the impact range of the churn is obtained, the substitute node of the failed node is determined as the successor node according to the features of the Chord network. The substitute node may find the LDN nodes in each range according to the calculated range. For example, LDN[m−1] of node N8 ought to be a node whose routing table contains a last entry directed to N8, that is, the node defined by: The successor corresponding to the (node ID+$2^{m-1}$) of the node is directed to N8. LDN[i] are the nodes defined by: The successor corresponding to the (node ID+$2^i$) of the nodes is directed to N8, where i ranges from 0 to m−1. The substitute node of F notifies all the LDNs in each impact range in the Chord ring, and tells the node failure information and the churn range.

The LDNs multicast the information within their ranges, and send a notification to the nodes whose routing table pointer has been directed to node F. The notification indicates that node F has failed and the substitute node is the successor node of F. The nodes in the impact range update their own routing table according to this notification.

IV. Taking a Koorde DHT as an Example

The Koorde DHT introduces the conception of the de Bruijn diagram on the basis of the Chord, with a view to improving the Chord route.

In a Koorde network, when node F fails, its predecessor node X and its successor node Y discover the failure information through probing. According to the features of the Koorde network architecture, the key value of a node in the Koorde network is stored in the nearest successor node. Therefore, when node F fails, the substitute node of the failed node is specified to be the successor node Y, and the range of the nodes (node N) which need to know the failure information is:

$$\begin{cases} F \in (X, Y] & (1) \\ F \notin (N, \text{successor}(N)] & (2) \\ i \cdot topBit(kshift) \notin (N, \text{successor}(N)] & (3) \end{cases}$$

By reference to the foregoing equation, when node N fulfills:

The predecessor node of the failed node 0 is X and the successor node is Y;

node F is outside N and the successor node range of N (the range includes the successor node of N (successor (N)) but does not include N); and the de Bruijn virtual node i of F after being shifted through topBit(kshift) is also outside N and the successor node range of N (the range includes the successor node of N (successor (N)) but does not include N). If node N fulfills the three expressions, N is the node that needs to be notified of the failure information.

Node Y multicasts the failure information to the LDN nodes within the range, and instructs the LDN nodes to forward the failure information of the node within the range.

To sum up, the technical solution under the present invention makes use of the symmetric mechanism implemented on the existing DHT routing table, and calculates the range of impact of the churn information quickly according to the distance between node ID of the churn node and the node ID of the neighboring nodes after a node churns in the network. The neighboring node notifies the churn information to the remote node that desires the information within the range proactively, and maintains the hop of route between the original two nodes, thus preventing the remote node from crawling to search for the churn node. When a node fails, as against notifying only K neighboring nodes, notifying the remote node in the routing table makes the network more perceptive to the node churn. The notification information magnitude is O(log N) or O(1), depending on the size of the routing table of each node in the DHT. In this way, the efficiency of the whole P2P network in searching for routes in a churn environment is improved, the system maintenance overhead is cut back, and the system stability is improved.

Figure 7A:
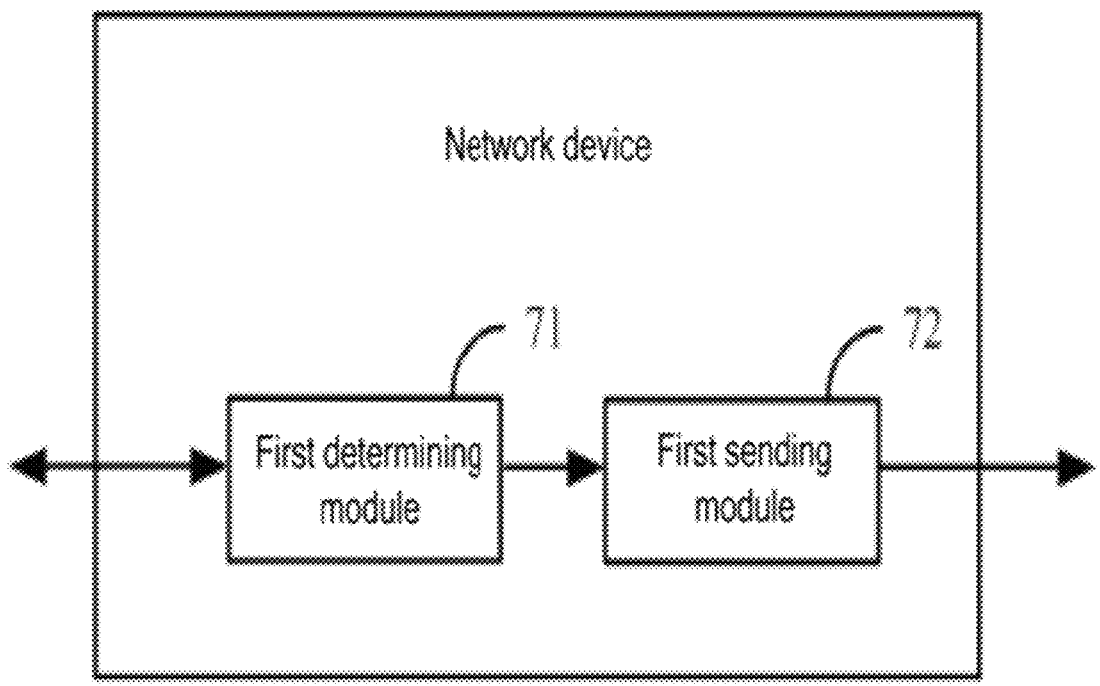
FIG. 7A, FIG. 7B, FIG. 7C, FIG. 8A and FIG. 8B show a schematic structural view of a network device according to an embodiment of the present invention.

Based on the same conception, a network device is disclosed in an embodiment of the present invention. As shown in FIG. 7A, the network device includes: a first determining module 71, adapted to determine the range of the nodes whose route is directed to the failed node according to the distance between the failed node and the neighboring node of the failed node; and a first sending module 72, adapted to send the failure information of the failed node to the LDN of the failed node within the node range.

Figure 7B:
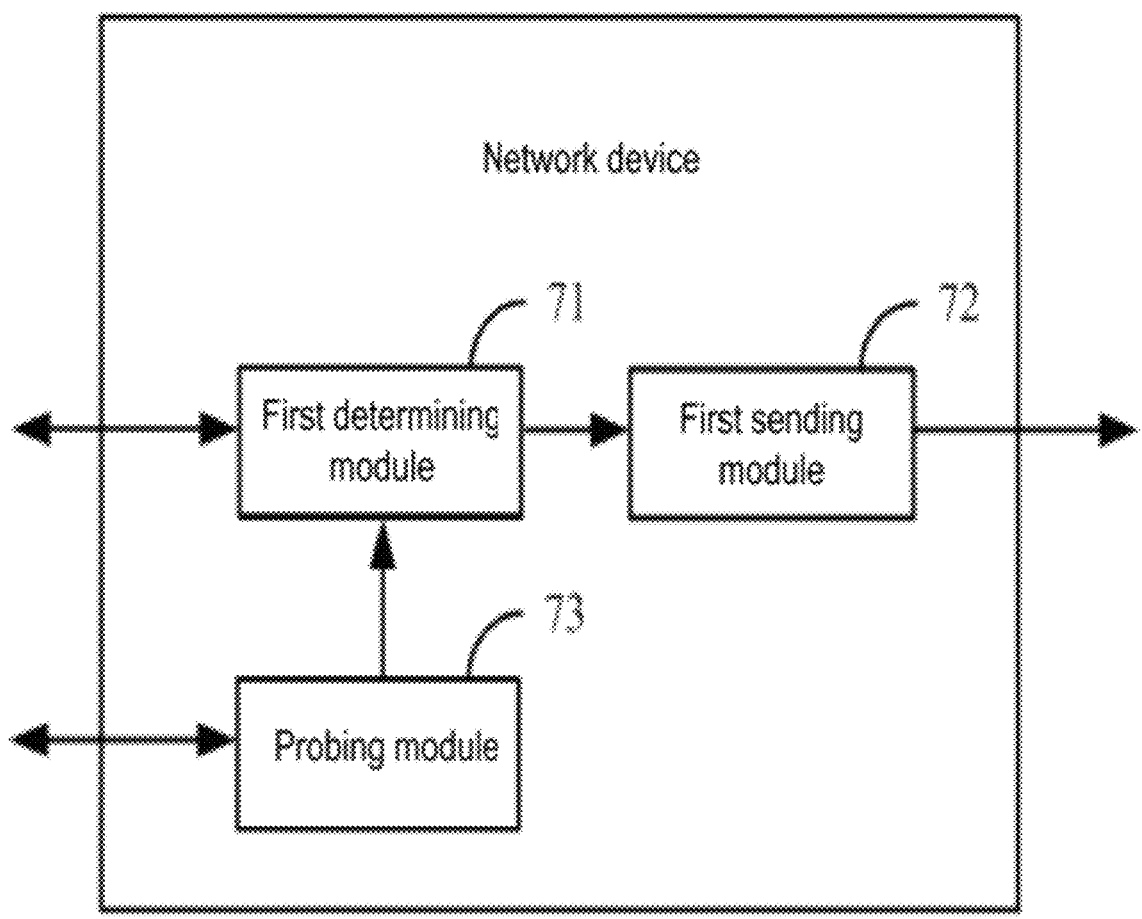

As shown in FIG. 7B, the network device shown in FIG. 7A in an embodiment may further include a probing module 73, adapted to probe the state of the neighboring node in the network at set intervals and determine the failed node.

In an embodiment, the first determining module 71 may be further adapted to determine the range of the nodes whose route is directed to the failed node according to the distance between the failed node and the neighboring node of the failed node as well as the network route features.

Figure 7C:
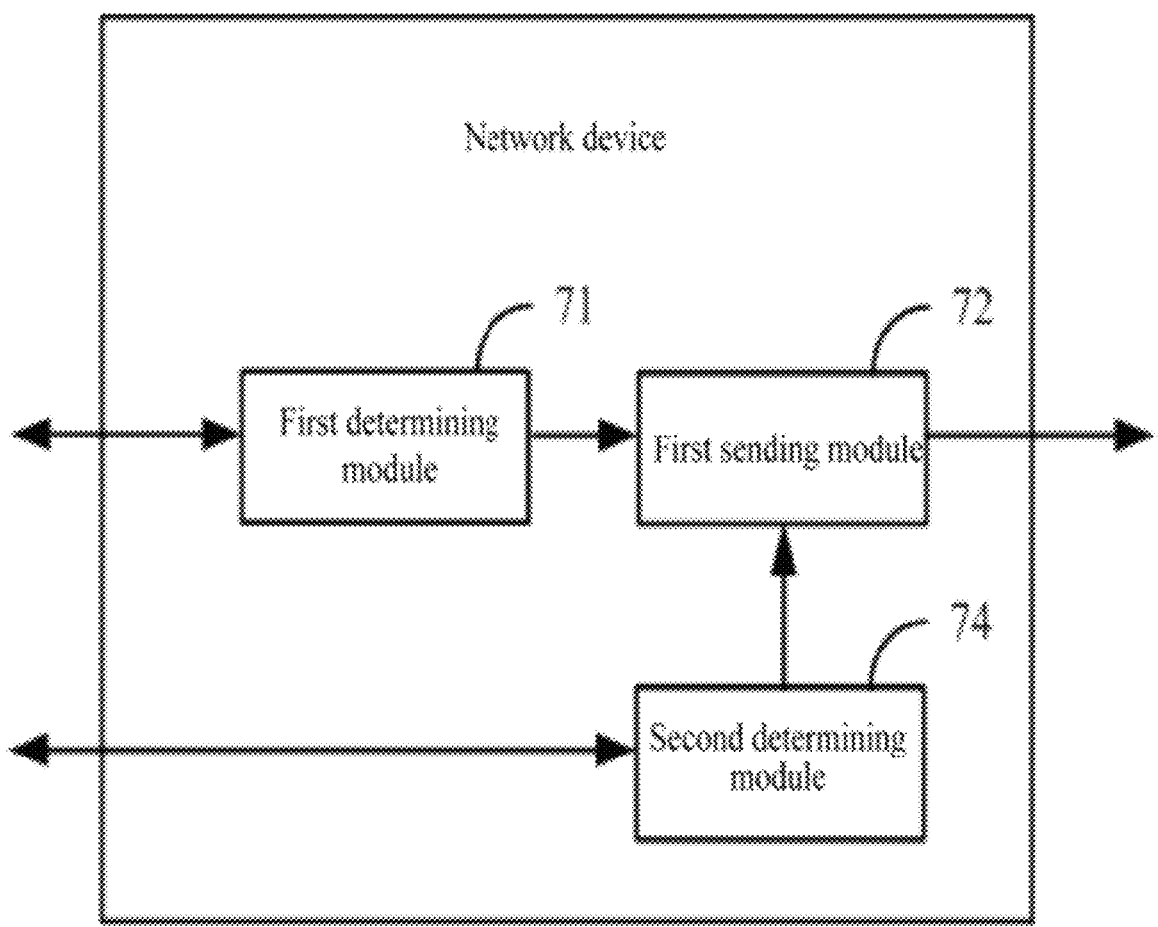

As shown in FIG. 7C, the network device shown in FIG. 7A in an embodiment may further include a second determining module 74, adapted to determine the substitute node for sending the failure information among the neighboring nodes of the failed node according to the key value features stored in the network.

If the network is a Kademlia DHT network or a Pastry DHT network, the second determining module 74 may be further adapted to determine the substitute node to be the neighboring node at the minimum XOR distance away from the failed node. Optionally, if the network is a Chord DHT network or a Koorde DHT network, the second determining module 74 may be further adapted to determine the substitute node to be the successor node of failed node.

The failure information includes the address of the substitute node, and may further include at least one of the identifier of the failed node, the address of the failed node and the key value of the failed node. The failure information may further include the range of impact caused by the failed node onto the LDN.

Figure 8A:
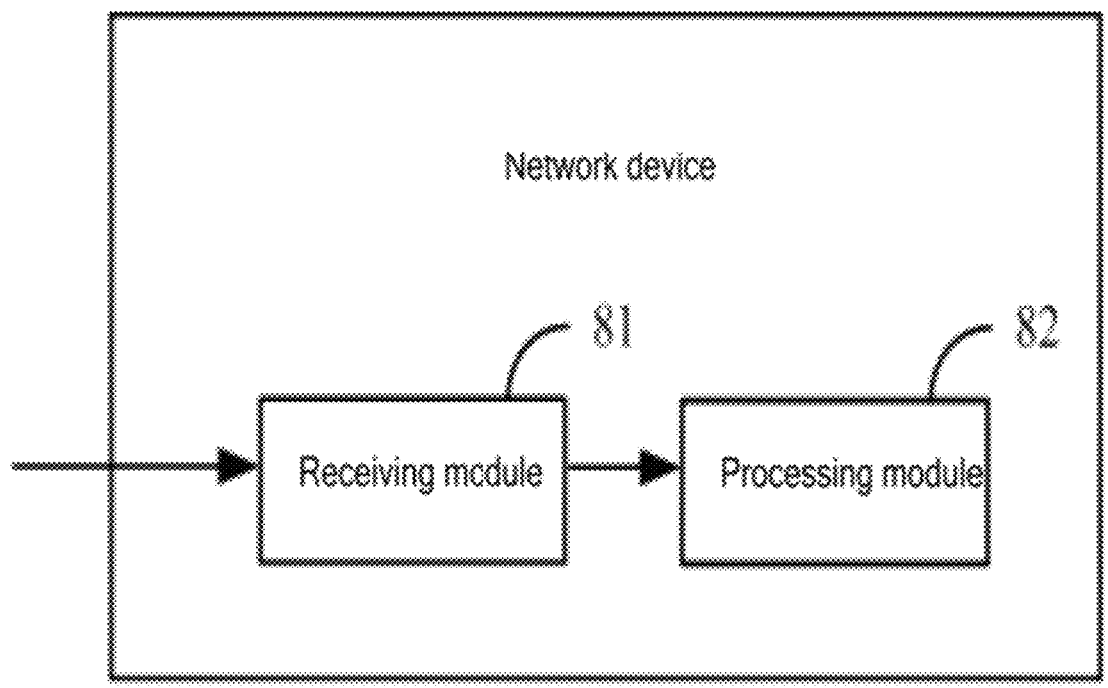

Based on the same conception, a network device is disclosed in an embodiment of the present invention. The network device is the LDN of the failed node. As shown in FIG. 8A, the network device includes:

a receiving module 81, adapted to receive the failure information of the failed node, where the failure information includes the address of the substitute node of the failed node; and a processing module 82, adapted to update the routing table according to the failure information.

In an embodiment, the failure information may further include at least one of an identifier of the failed node, an address of the failed node, and a key value of the failed node.

Figure 8B:
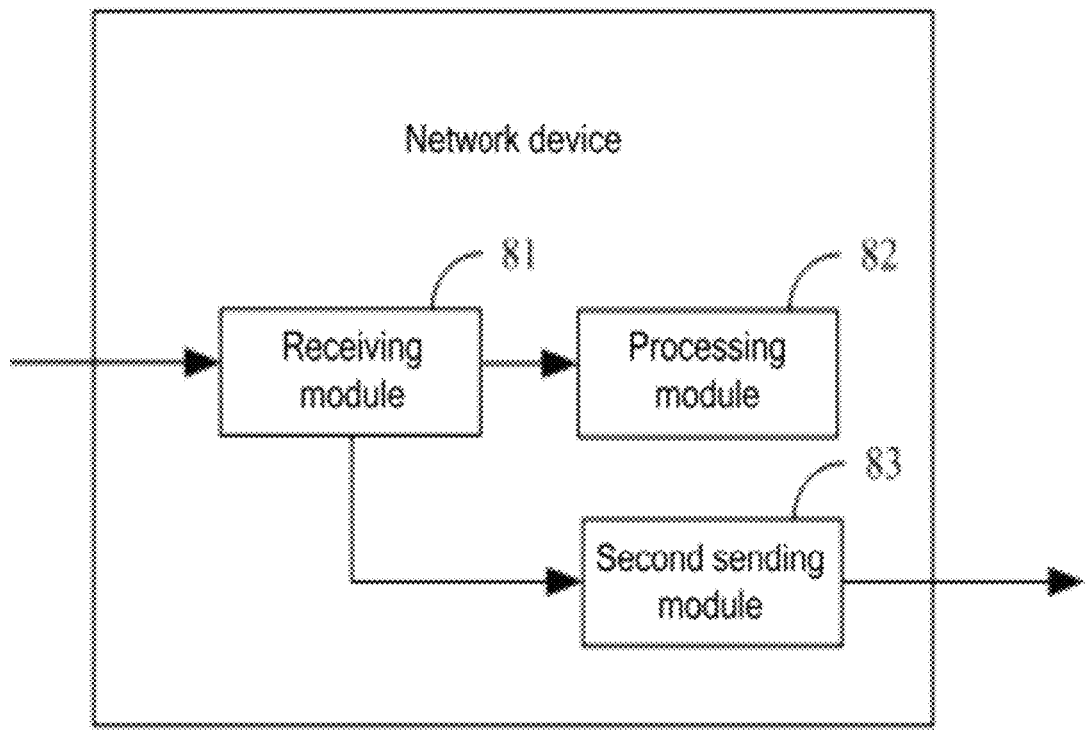

The failure information may further include the range of impact caused by the failed node onto the local node. In this case, as shown in FIG. 8B, the network device shown in FIG. 8A may further include a second sending module 83, adapted to forward the failure information to the nodes within the impact range after the receiving module 81 receives the failure information.

In an embodiment, the failure information includes the range of impact caused by the failed node onto the local node. In this case, the second sending module 83 may be further adapted to forward the failure information to the nodes within the impact range directly after the receiving module 81 receives the failure information if the impact range does not exceed the maintenance range of the neighboring nodes of the local node. Alternatively, when the impact range exceeds the maintenance range of the neighboring nodes of the local node, the second sending module 83 may be further adapted to forward the failure information to the neighboring node nearest to the impact range, and instruct the neighboring node to forward the failure information to other nodes in the impact range. The determining of the impact range here is similar to the determining of the impact range in a different P2P network mentioned above (for example, Kademlia network, Pastry network, Chord network, Koorde network).

Figure 9:
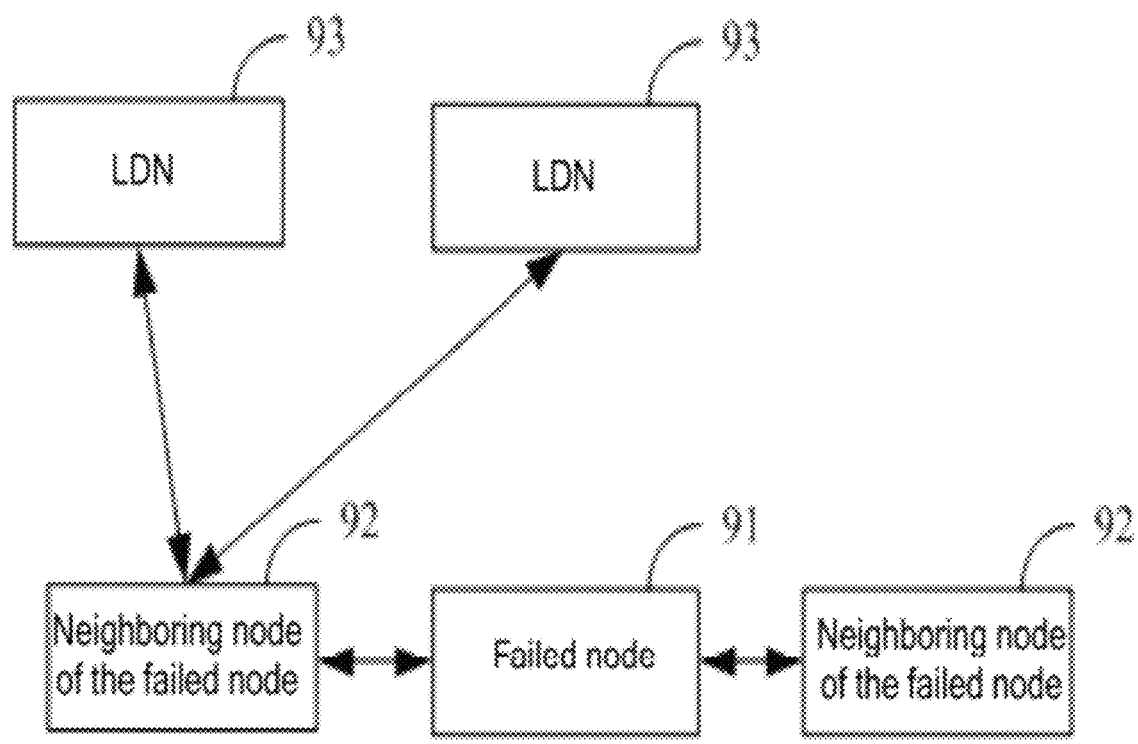
FIG. 9 shows a schematic structural view of a communication network according to an embodiment of the present invention.

Based on the same conception, a P2P communication network is disclosed in an embodiment of the present invention. As shown in FIG. 9, the P2P communication network includes: a failed node 91, a neighboring node 92 of the failed node, and an LDN 93. The neighboring node 92 of the failed node is adapted to determine the range of the nodes whose route is directed to the failed node according to the distance between the failed node and the neighboring node of the failed node, and send the failure information of the failed node to the LDN of the failed node within the node range. The LDN 93 is adapted to receive the failure information, and update the routing table according to the failure information.

It is understandable to those skilled in the art that all or part of the steps in the foregoing embodiments may be performed through hardware instructed by a program. The program may be stored in a computer-readable storage medium such as the ROM/RAM, magnetic disk, and compact disk.

In the embodiments of the present invention, the range of the nodes whose route is directed to the failed node is determined according to the distance between the failed node and the neighboring node of the failed node; the failure information of the failed node is sent to the LDN of the failed node within the node range; and the LDN updates the routing table according to the failure information, and notifies the neighboring nodes within the node range to update the their respective routing table. Compared with the prior art which notifies the failure information to only K neighboring nodes in the case of node failure, the embodiments of the present invention enhance the capability of whole the P2P network in perceiving node churn, and improve the route search efficiency and system stability of the whole P2P network.

It is apparent that those skilled in the art can make various modifications and variations to the present invention without departing from the spirit and scope of the present invention. The present invention is intended to cover such modifications and variations provided that they fall in the scope of protection defined by the following claims or their equivalents.

What is claimed is:

1. A method for updating routing table information after a node fails in a P2P network, comprising:
   determining range of the nodes whose route is directed to a failed node according to the distance between the failed node and a neighboring node of the failed node;
   sending failure information of the failed node to a Long Distance Neighbor (LDN) of the failed node within each node range; and
   notifying the LDN to update corresponding routing table information according to the failure information.

2. The method according to claim 1, further comprising:
   probing state of neighboring nodes at set intervals and determining the failed node.

3. The method according to claim 1, the process of determining range of the nodes whose route is directed to a failed node according to the distance between the failed node and a neighboring node of the failed node further comprising:
   determining range of the nodes whose route is directed to a failed node according to the distance between the failed node and a neighboring node of the failed node, and the route features of the network.

4. The method according to claim 1, wherein the process of sending failure information of the failed node to a Long Distance Neighbor (LDN) of the failed node within each node range comprises:
   determining a substitute node among the neighboring nodes of the failed node to send the failure information, according to the key value feature stored in the network; and
   instructing the substitute node to send the failure information to the LDN of the failed node within each node range.

5. The method according to claim 4, wherein the substitute node is the neighboring node at the minimum XOR distance away from the failed node if the network is a Kademlia DHT network or a Pastry DHT network; or the substitute node is the successor node of failed node if the network is a Chord DHT network or a Koorde DHT network.

6. The method according to claim 1, wherein the failure information includes range of impact caused by the failed node onto the LDN, and the method further comprises:
   forwarding, by the LDN, the failure information to the nodes within the impact range, after receiving the failure information.

7. The method according to claim 6, wherein the process of forwarding, by the LDN, the failure information to the nodes within the impact range comprises:
   forwarding the failure information to the nodes within the impact range, when the LDN determines that the impact range does not exceed the maintenance range of the neighboring nodes of the local node; or
   forwarding the failure information to the neighboring node nearest to the impact range, and notifying the neighboring node to further forward the failure information to other nodes in the impact range, when the LDN determines that the impact range exceeds the maintenance range of the neighboring nodes of the local node.

8. The method according to claim 6, further comprising:
   updating, by the node in the impact range, corresponding routing table information according to the failure information, after receiving the failure information.

9. A network device, comprising:
   a first determining module 71, adapted to determine range of the nodes whose route is directed to the failed node according to the distance between the failed node and the neighboring node of the failed node; and
   a first sending module 72, adapted to send the failure information of the failed node to the LDN of the failed node within the node range.

10. The device according to claim 9, further comprising:
    a probing module 73, adapted to probe the state of the neighboring node in the network at set intervals and determine the failed node.

11. The device according to claim 9, wherein the first determining module 71 is further adapted to determine the range of the nodes whose route is directed to the failed node according to the distance between the failed node and the neighboring node of the failed node as well as the network route features.

12. The device according to claim 9, further comprising:
    a second determining module 74, adapted to determine the substitute node for sending the failure information among the neighboring nodes of the failed node according to the key value features stored in the network.

13. The device according to claim 12, wherein: the second determining module 74 is further adapted to determine the substitute node to be the neighboring node at the minimum XOR distance away from the failed node, if the network is a Kademlia DHT network or a Pastry DHT network; or the second determining module 74 is further adapted to determine the substitute node to be the successor node of failed node if the network is a Chord DHT network or a Koorde DHT network.

14. A network device, comprising:
- a receiving module 81, adapted to receive the failure information of the failed node, wherein the failure information includes the address of the substitute node of the failed node;
- a processing module 82, adapted to update the routing table according to the failure information;
- wherein the receiving module 81 is further adapted to receive the failure information including the range of impact caused by the failed node onto the local node; and
- a second sending module 83, adapted to forward the failure information to the nodes within the impact range after the receiving module 81 receives the failure information.

15. The device according to claim 14, wherein that the second sending module 83 is further adapted to forward the failure information to the nodes within the impact range after the receiving module 81 receives the failure information if the impact range does not exceed the maintenance range of the neighboring nodes of the local node; and to forward the failure information to the neighboring node nearest to the impact range, and instruct the neighboring node to forward the failure information to other nodes in the impact range, if he impact range exceeds the maintenance range of the neighboring nodes of the local node.

16. Computer readable storage medium, comprising computer program codes which when executed by a computer processor cause the compute processor to execute the steps of:
- determining range of the nodes whose route is directed to a failed node according to the distance between the failed node and a neighboring node of the failed node;
- sending failure information of the failed node to a Long Distance Neighbor (LDN) of the failed node within each node range; and
- notifying the LDN to update corresponding routing table information according to the failure information.

17. The computer readable storage medium according to claim 16, further comprising computer program codes which when executed by a computer processor cause the compute processor to execute the steps of:
- probing state of neighboring nodes at set intervals and determining the failed node.

18. The computer readable storage medium according to claim 16, wherein the process of sending failure information of the failed node to a Long Distance Neighbor (LDN) of the failed node within each node range comprises:
- determining a substitute node among the neighboring nodes of the failed node to send the failure information, according to the key value feature stored in the network; and
- instructing the substitute node to send the failure information to the LDN of the failed node within each node range.

* * * * *